J. OBRIST.
Pinchers.
No. 219,504. Patented Sept. 9, 1879.
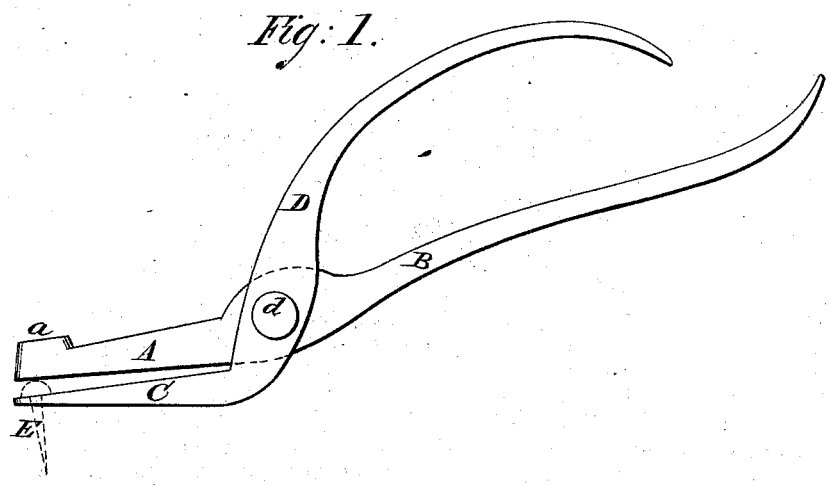
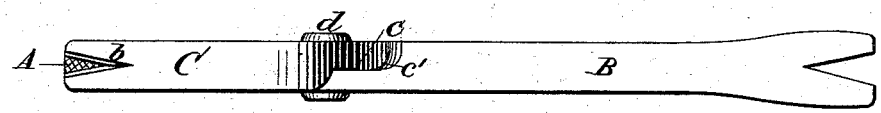
WITNESSES:
Achilles Schehl.
C. Sedgwick
INVENTOR:
J. Obrist
BY Munn & Co
ATTORNEYS.

UNITED STATES PATENT OFFICE

JACOB OBRIST, OF AU SABLE FORKS, NEW YORK.

IMPROVEMENT IN PINCHERS.

Specification forming part of Letters Patent No. 219,504, dated September 9, 1879; application filed March 17, 1879.

*To all whom it may concern:*

Be it known that I, JACOB OBRIST, of Au Sable Forks, in the county of Essex and State of New York, have invented a new and Improved Pinchers, of which the following is a specification.

The object of this invention is to provide an implement for holding and entering tacks in putting down carpets, trimming and covering furniture, and other similar purposes.

It consists in providing the lower jaw of the pinchers with a V-shaped notch to receive the shank of the tack, while the upper jaw bears upon the head and holds it securely while being entered; also, in curving the handles, so as to permit the lower jaw to rest upon the floor and leave space for the hand under the handle.

In the accompanying drawings, Figure 1 is a side elevation of my improvement; and Fig. 2 is a plan of the same, looking toward the bottom or lower jaw.

Similar letters of reference indicate corresponding parts.

Referring to the drawings, A represents the upper jaw, made with a straight flat face, and having on its upper side, at the end, a knob, *a*, to receive the blows of a hammer. The handle B of this jaw is extended backward and upward at an obtuse angle to the face of the jaw, as clearly shown.

C is the under jaw, tapered off to the end, where it is provided with a V-shaped notch, *b*, having outwardly-beveled edges, so as to present sharp biting-edges on the upper side. The handle D of this jaw is bent up nearly to a right angle with the jaw, and is then curved over toward handle B.

Just above the angle of the lower jaw a rabbet, *c*, is made in handle D, and where jaw A runs into its handle is made a similar rabbet, *c'*, and these two parts, being put together, are secured by a lateral pivot, *d*, so that the two jaws lie directly together, as clearly shown in the drawings.

The operation of the implement is as follows: The shank of a tack, E, is inserted in the V-shaped notch *b*, with the head above, and the upper jaw is pressed upon it, holding it firmly; and when carpet is to be put down, the tack thus held can be used to take hold of the edge of the carpet and stretch it. When at the proper point the tack is thrust down into the wood, and while held by the pinchers the knob *a* is struck by a hammer, driving the tack in. The pinchers are then taken from the tack, and a few blows more of the hammer drives the tack home.

The curvature of the handles, as shown in Fig. 1, gives space to hold the jaws in contact with the floor or other object without the hand coming in contact therewith.

The device facilitates the entering of tacks, and saves the fingers from being mashed and bruised, as when the tacks are held by them.

Having thus described my invention, I claim as new and desire to secure by Letters Patent—

A pair of pinchers whose upper jaw is a clamp, and the lower bifurcated at the front and made thin, to pass under the head of a tack and straddle its shank, as shown and described.

JACOB OBRIST.

Witnesses:
H. D. GRAVES,
GEO. L. GRAY.